Nov. 18, 1941.  W. B. WEST  2,263,255
DISPLAY MERCHANDISER
Filed Aug. 15, 1939
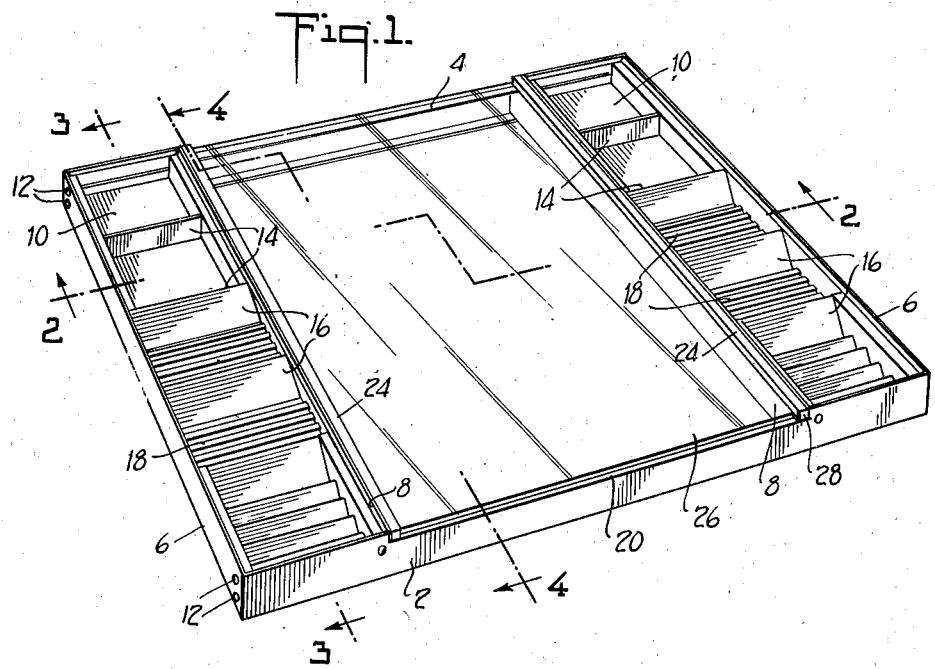
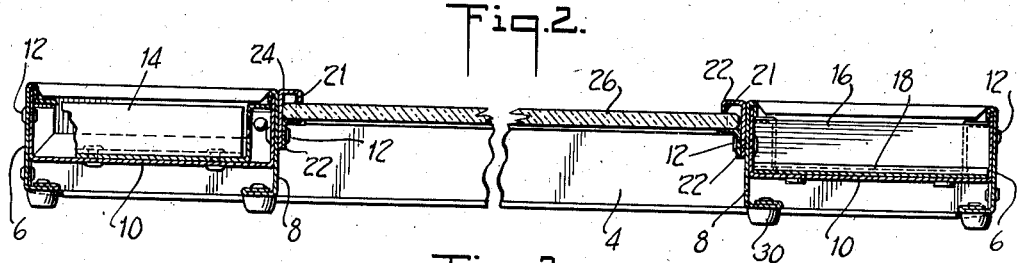
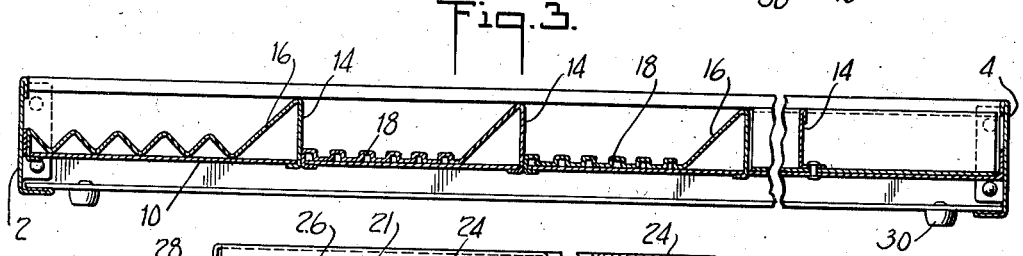
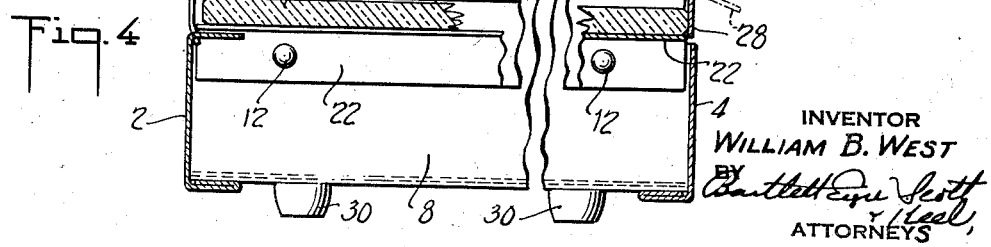
INVENTOR
WILLIAM B. WEST
BY
ATTORNEYS Patented Nov. 18, 1941

2,263,255

UNITED STATES PATENT OFFICE 2,263,255

DISPLAY MERCHANDISER

William B. West, Canajoharie, N. Y., assignor to Beech-Nut Packing Company, Canajoharie, N. Y., a corporation of New York Application August 15, 1939, Serial No. 290,169

1 Claim. (Cl. 312—117)

The present invention relates to display merchandisers that are adapted to be placed on the glass counters or show cases of a store, and has for its object to provide a novel and improved device of this character.

The preferred embodiment of the invention is illustrated, by way of example, in the accompanying drawing, in which:

Figure 1 is a view in perspective of the device;

Figs. 2 and 3 are sectional views, partly broken away, respectively taken on the lines 2—2 and 3—3 of Fig. 1; and Fig. 4 is a sectional view taken on the line 4—4 of Fig. 1.

The display merchandiser as illustrated in the drawing comprises a rectangular frame of sheet metal having a front frame member 2, rear member 4, and side members 6.

Extending between the front and rear members and spaced from the side members 6, are sheet metal members 8. In the space between the members 6 and 8 on each side is a tray 10 which may be secured to said members by rivets 12. Each tray 10 may be divided transversely into separate trays or compartments by partitions 14. Some of the partitions may have vertical portions having their lower ends secured to their associated tray 10, a forwardly and downwardly inclined portion 16, and a horizontal portion 18 that forms the bottom of the compartment. The portion 18 may be transversely corrugated in a suitable manner as shown to conveniently support small packages such as five cent packages of chewing gum. The two rearmost compartments may be of a form to contain five cent packages or boxes of candy or chewing gum. The compartments may be varied to accommodate various sizes and shapes of small packages.

The front and rear frame members are each provided with a cutaway portion 20 between the side trays. A groove or channel 21 is provided at the upper portion of the outer sides of the members which is formed by strips 22 and 24 secured by said rivets 12 to said members 8.

These grooves or channels 21 are adapted to receive the longitudinal edges of a glass plate or sheet 26 which may be slid into position between the side trays.

The glass 26 may be held in position by downwardly bent lips 28 at the ends of the channels 21. Upon bending up the lips 28 at the rear of the device, the glass may be removed and replaced for cleaning purposes.

The tops of the channel members 24 are arranged in the plane of the tops of the side trays, while the glass 26 is spaced slightly below that level. The device may be supported by members 30 of rubber secured to the under sides of the frame members.

The device is particularly adapted for use on glass counters and show cases. When thus used it serves to protect the glass counter from coin scratches. In case the glass of the tray becomes scratched it may be replaced at small expense.

The glass is spaced about one inch from the top of the glass counter so as to provide a suitable display space for items that the storekeeper may desire to prominently display under glass.

The provision of the trays for small packages of chewing gum and candy along side of the glass where the customer receives the change, attractively displays the merchandise to him to the best advantage while he is waiting for his change.

As will be evident to those skilled in the art, my invention permits various modifications without departing from the spirit thereof or the scope of the appended claim.

What I claim is:

In a display merchandiser of the class described adapted to be placed upon the glass top of a show case in a store, a frame having front, rear and side walls, members extending between the front and rear walls and spaced inwardly from said side walls, a tray arranged between each of said members and the associated side wall and extending between the front and rear walls, and a sheet of glass extending between the upper edge portions of said spaced members and between said front and rear walls and arranged parallel with the bottom of the frame, the bottom of the portion of the frame beneath said sheet of glass being open.

WILLIAM B. WEST.